US008839764B2

(12) United States Patent
Graspeuntner et al.

(10) Patent No.: US 8,839,764 B2
(45) Date of Patent: Sep. 23, 2014

(54) FUEL SUPPLY SYSTEM FOR HEAVY OIL COMMON-RAIL INJECTION SYSTEMS

(75) Inventors: Christian Graspeuntner, Hallein (AT); Joachim Lackner, Vigaun (AT); Johannes Schnedt, Salzburg (AT)

(73) Assignee: Robert Bosch GmbH, Stuttgart-Feuerbach (DE)

( * ) Notice: Subject to any disclaimer, the term of this patent is extended or adjusted under 35 U.S.C. 154(b) by 721 days.

(21) Appl. No.: 13/123,245

(22) PCT Filed: Oct. 8, 2009

(86) PCT No.: PCT/AT2009/000390

§ 371 (c)(1),
(2), (4) Date: Apr. 8, 2011

(87) PCT Pub. No.: WO2010/040163

PCT Pub. Date: Apr. 15, 2010

(65) Prior Publication Data

US 2011/0192376 A1 Aug. 11, 2011

(30) Foreign Application Priority Data

Oct. 10, 2008 (AT) ................................ A 1596/2008

(51) Int. Cl.
*F02M 37/00* (2006.01)
*F02M 69/46* (2006.01)
*F16K 31/30* (2006.01)
*F02M 63/00* (2006.01)
*F02M 63/02* (2006.01)

(52) U.S. Cl.
CPC ......... *F02M 63/004* (2013.01); *F02M 63/0052* (2013.01); *F02M 63/0275* (2013.01); *F02M 63/025* (2013.01); *F02M 37/0029* (2013.01)
USPC ........... 123/454; 123/456; 123/511; 123/510; 123/514

(58) Field of Classification Search
CPC . F02M 55/025; F02M 69/462; F02M 69/465; F02M 63/0225; F02M 69/26; F02M 37/0023; F02M 37/0229; F02M 37/106; F02M 37/0052; F02B 1/00; F16K 31/44; B25C 1/04; B25C 1/043
USPC ................. 123/510, 511, 514, 447, 454, 456; 251/63, 635.5, 234
See application file for complete search history.

(56) References Cited

U.S. PATENT DOCUMENTS 2,243,711 A * 5/1941 Lamb ......................... 137/514.3
(Continued)

FOREIGN PATENT DOCUMENTS

AT 414027 B 8/2006
(Continued)

OTHER PUBLICATIONS

International Search Report corresponding with International Application No. PCT/AT2009/000390 dated Apr. 19, 2010, 6 pages (in German/English).

*Primary Examiner* — Hai Huynh
*Assistant Examiner* — Raza Najmuddin
(74) *Attorney, Agent, or Firm* — Fitch, Even, Tabin & Flannery LLP

(57) ABSTRACT

In a fuel supply system for heavy oil common-rail injection systems for internal combustion engines, including a tank (1), a primary feed pump (3) for delivering heavy oil from the tank (1) to a high-pressure pump (5), wherein the high-pressure pump (5), via at least one high-pressure line (12), is connected to a high-pressure accumulator (rail) (6) feeding at least one injector (8), and, furthermore, a purge valve (9), which is connected to the high-pressure accumulator via a separate high-pressure line (15) for directing at least a portion of the heavy oil back into the tank (1) via a return line, the purge valve (9) includes a valve member (28) which is movable between an opened and a closed position, a high-pressure connection for a high-pressure line (15) communicating with a heavy oil high-pressure accumulator (rail) (6), a low-pressure connection for a return line, and actuating means for actuating the valve member (28), wherein the valve seat (29) of the valve member (28) is designed as a sliding seat.

10 Claims, 3 Drawing Sheets

(56) References Cited

U.S. PATENT DOCUMENTS

Figure 1:
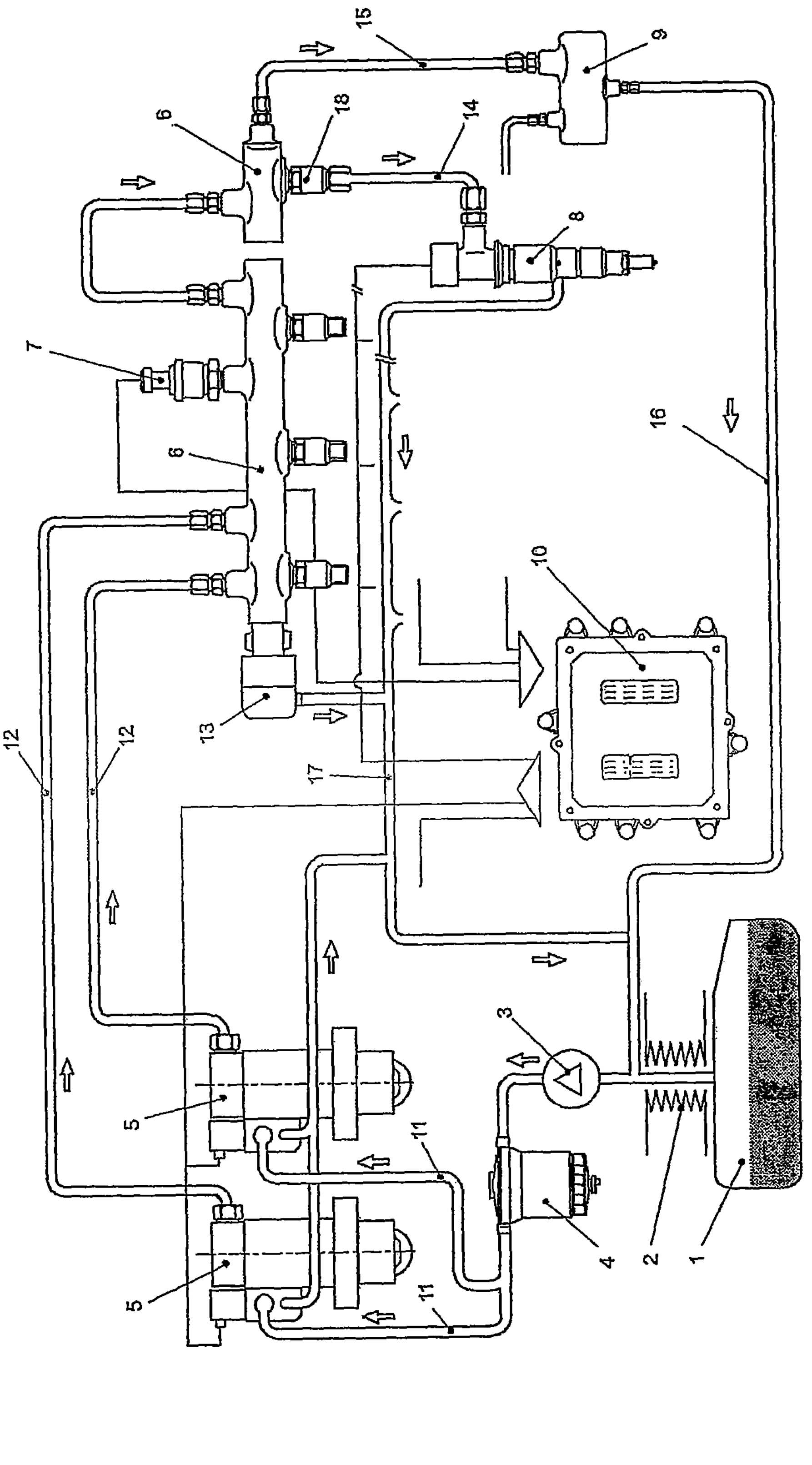

| | | | | | |
|---|---|---|---|---|---|
| 2,705,020 | A * | 3/1955 | Frantz | ...................... | 137/625.66 |
| 3,355,139 | A * | 11/1967 | Kittredge | ................... | 251/30.01 |
| 4,187,870 | A * | 2/1980 | Akkerman | .................... | 137/102 |
| 4,585,207 | A * | 4/1986 | Shelton | ........................... | 251/62 |
| 4,825,909 | A * | 5/1989 | Martin et al. | ................. | 137/879 |
| 4,865,079 | A * | 9/1989 | Martin et al. | ................. | 137/879 |
| 5,626,114 | A | 5/1997 | Kushida et al. | | |
| 6,067,955 | A | 5/2000 | Boecking | | |
| 2002/0148990 | A1 * | 10/2002 | Kandel | ........................... | 251/14 |
| 2009/0101854 | A1 * | 4/2009 | Jeon | ................................ | 251/63 |

FOREIGN PATENT DOCUMENTS

| | | | |
|---|---|---|---|
| CN | 1081748 | A | 2/1994 |
| DE | 19742073 | A1 | 3/1999 |
| DE | 19909329 | A1 | 9/2000 |
| DE | 10046829 | A1 | 4/2002 |
| DE | 10164395 | A1 | 7/2003 |
| DE | 102008014250 | A1 | 9/2009 |
| EP | 1320677 | B1 | 3/2006 |
| GB | 2330871 | A | 5/1999 |
| JP | 58-128460 | A | 8/1983 |
| JP | 10-160002 | A | 6/1998 |

* cited by examiner

FUEL SUPPLY SYSTEM FOR HEAVY OIL COMMON-RAIL INJECTION SYSTEMS

CROSS-REFERENCE TO RELATED APPLICATIONS

This is a U.S. National Phase of International Application PCT/AT2009/000390, filed Oct. 8, 2009, and claims the benefit of foreign priority under 35 U.S.C. §119 from Austrian Patent Application A 1596/2008, filed Oct. 10, 2008, the entire disclosures of which are hereby incorporated herein by reference.

The invention relates to a fuel supply system for heavy oil common-rail injection systems for internal combustion engines, including a tank, a primary feed pump for delivering heavy oil from the tank to a high-pressure pump, wherein the high-pressure pump, via at least one high-pressure line, is connected to a high-pressure accumulator (rail) feeding at least one injector and, furthermore, a purge valve, which is connected to the high-pressure accumulator via a separate high-pressure line for directing at least a portion of the heavy oil back into the tank via a return line.

For cost reasons, low-quality fuels such as heavy oil are used for very large diesel engines, particularly marine diesel engines. Due to the specific physical properties of heavy oils, special measures must be taken for heavy oil operation. The viscosity of heavy oil, for instance, is substantially higher than that of regular diesel fuel such that heating to above 80° C. is required in order to enable the pumping of heavy oil at all.

The high viscosity of heavy oil requires fuel to be constantly pumped in circulation within the line system, even at a standstill of the engine, in order to prevent the solidification of heavy oil in the lines.

To this end, heavy oil common-rail injection systems of the initially defined kind comprise a purge valve, which is closed during the operation of the engine so as to close the high-pressure-side parts of the fuel system, and hence also the rail, relative to a low-pressure-side fuel return line, through which fuel can be returned back into the tank. At a standstill of the engine, the purge valve can be opened so as to cause fuel to be recirculated from the high-pressure side through the high-pressure lines and the rail through the valve to the low-pressure side and, subsequently, into the tank, wherein the fuel is maintained at an appropriate temperature by a preheater so as to prevent the solidification of the heavy oil in the lines.

In addition to enabling the creation of a recirculation flow for tempering the fuel within the system, the purge valve at the same time also functions as an emergency stop valve. By suitably activating the purge valve, the system pressure can be lowered very quickly in case of emergency without having to deactivate the injectors themselves.

The hitherto known configurations of such purge valves comprised valves provided with conventional valve seats, in which a frustoconical valve member was each pressed onto a valve seat, with the sealing effect having been achieved by an accordingly strong surface pressure. Those configurations involved the disadvantage that sealing problems occurred with an increasing service life of the purge valve: Particles may predamage the conical seat, and erosive properties of the fuel may completely destroy the seat. Another wear mechanism comprises micro-movements caused by the actuation of the purge valve. Due to the wear on the valve seat, the existing surface pressure is reduced, and leakiness occurs.

It is thus the object of the present invention to further develop a fuel supply system of the initially defined kind to the effect that wear phenomena on the purge valve and their consequences will be reduced and the service life and operating safety of a purge valve used in such a fuel supply system will be improved.

To solve this object, a fuel supply system according to the present invention, of the initially defined kind is further developed such that the valve seat of the valve member is designed as a sliding seat. With such a purge valve configuration, the sealing effect is achieved not by pressing a sealing surface onto a valve seat, but by an increased overlap length of the sealing surfaces, between which a narrow gap is left. Small permanent leakages will occur in this construction. If particles are clamped between the sealing surfaces for a short time, they may cause damage, yet the sealing effect will not be affected by such damage because the sealing effect is brought about by the narrow gap and the overlap length. Prior to being fed into the heavy oil lines, the fuel can be preheated by the aid of a preheater such that the lines and other components will be kept at an appropriate temperature so as to avoid an excessive increase in the viscosity during standstill periods of the engine.

The fuel supply system according to the invention is advantageously further developed such that the valve member is displaceably guided in a valve sleeve and comprises a control edge formed by a setback, which control edge, for opening the valve, is displaceable into the region of the high-pressure line radially opening into the valve sleeve and, for closing the valve, is displaceable out of the mouth of the high-pressure line while forming an overlap of the valve member and the valve sleeve. In doing so, the sealing surfaces arranged on the outer jacket of the valve member and on the inner jacket of the valve sleeve cooperate with each other, thus providing a large overlap length such that only extremely small leakage amounts will occur with the valve closed. To open the valve, the valve member is then displaced in a manner that the control edge formed by the setback reaches the region of the mouth of the high-pressure line so as to allow the fuel to flow off via the valve member region which is delimited by the control edge and formed with a smaller diameter. When opening the valve, an annular flow cross section is thus released or increased. The size of the setback on the valve member determines the annular flow cross section and hence the flow rate, wherein a configuration may be devised such that the flow rate suffices to keep the viscosity of the heavy oil present in the lines accordingly low.

To increase the flow rate through the purge valve, the invention according to a preferred embodiment may be further developed to the effect that the high-pressure line opens into an annular groove of the valve sleeve. In this case, a retraction of the valve member into the region of the high-pressure line radially opening into the valve sleeve will immediately result in a relatively high flow rate.

The fuel supply system according to the invention is advantageously further developed to the effect that the maximum overlap corresponds to at least 0.1 to 0.5 times the diameter of the valve member so as to enable the achievement of the insensitivity of the purge valve to wear phenomena desired according to the invention, by selecting a sufficiently large overlap length of the sealing surfaces.

In a particularly simple manner, the invention is further developed to the effect that the actuators are configured as pneumatic means such that the actuator systems used so far for purge valves can also be used for the purge valves according to the invention, wherein, in a particularly simple manner, the invention is further developed to the effect that a line capable of being powered with pressure medium, particularly compressed air, opens into a chamber defined by a valve member surface extending transversely to the direction of displacement. The surface of the valve member extending transversely to the direction of displacement thus forms a piston in a suitable cylinder, which piston can be displaced by the pressure of the supplied pressure medium against the force of a spring, thus triggering the actuation of the valve member. To this end, a compression spring biasing the valve member in the closing sense is advantageously provided.

In order to ensure the automatic operation of the fuel supply system according to the invention, the fuel supply system according to the invention is advantageously further developed to the effect that a control device is provided, which cooperates with the purge valve for opening the valve at a standstill of the internal combustion engine.

Figure 2:
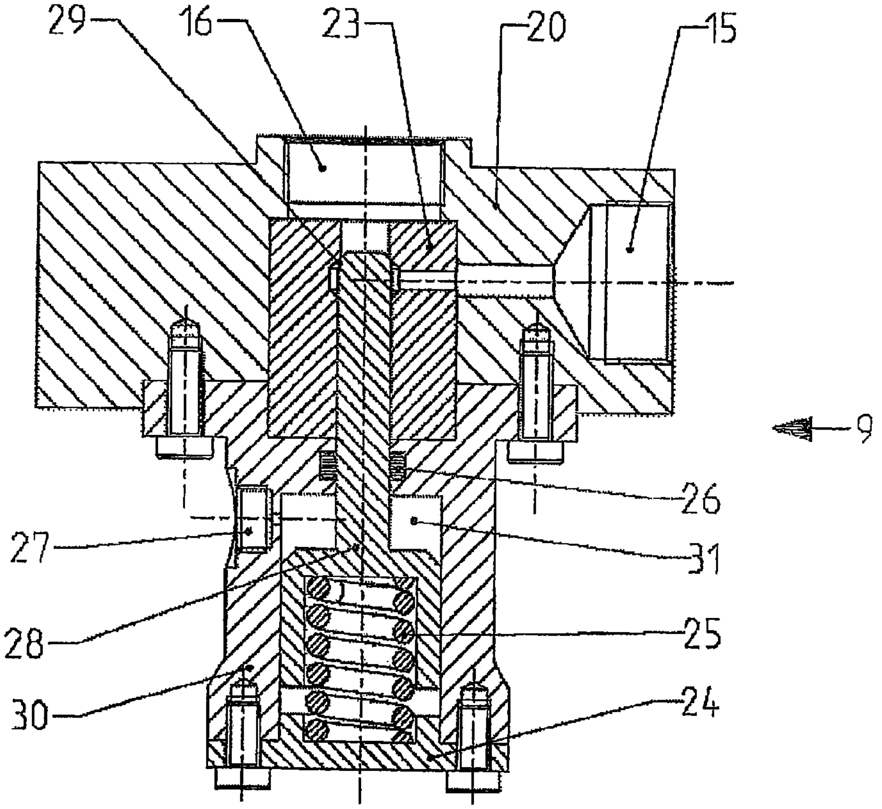
Fig. 2 Prior Art
Figure 3:
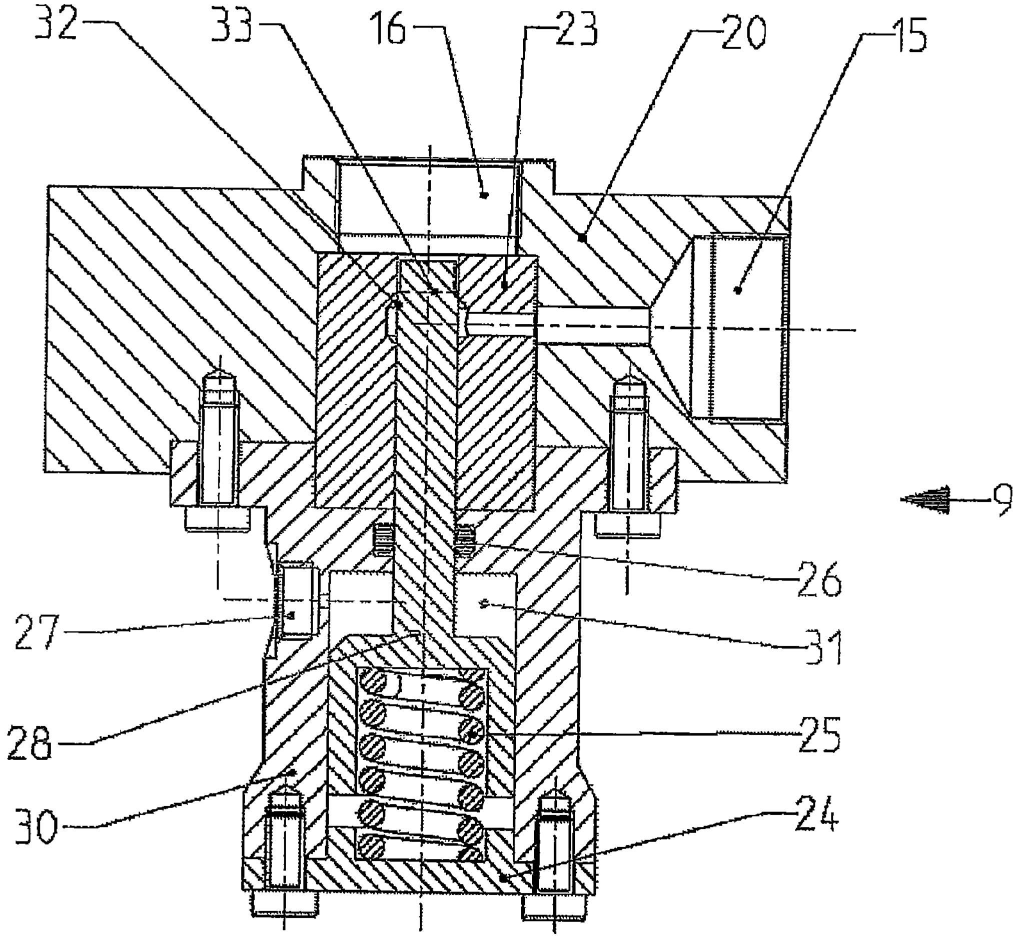

In the following, the invention will be explained in more detail by way of exemplary embodiments illustrated in the drawing. Therein, FIG. 1 depicts a fuel supply system according to the invention;

FIG. 2 illustrates a section through a purge valve according to the prior art; and FIG. 3 illustrates a purge valve of the fuel supply system according to the invention.

In FIG. 1, a heavy oil common-rail injection system is schematically illustrated. From the tank 1, fuel, which was preheated in a preheater 2, is supplied by a primary feed pump 3 via a fuel filter 4 and fuel supply lines 11 to at least one high-pressure pump 5, where the fuel is compressed to system pressures of above 1400 bar. Via high-pressure lines 12, the compressed fuel reaches at least one rail 6, which inter alia is equipped with at least one pressure control valve 13 and a rail pressure sensor 7. The pressure in the rail 6 is adjusted by the control device 10 by controlling the amount of fuel delivered into the high-pressure line 12 by the high-pressure pump 5. Departing from the rail 6, the fuel, via a flow limiter 18 and the high-pressure line 14, reaches the injector 8, which is also activated by the control device 10. The fuel control amount required for the functioning of the injector 8 is returned back into the tank 1 via the low-pressure lines 17. In order to be able to ensure the circulation of fuel in the line system even at a standstill of the engine, a further high-pressure line 15 leads from the rail 6 to a purge valve 9 which, activated by the control device 10, is able to directly return a portion of the fuel in low-pressure lines 16 leading directly back to the tank 1.

FIG. 2 illustrates a section through a purge valve 9 according to the prior art. The purge valve is composed of a body 20, a valve sleeve 23, a valve member 28, a housing 30, a spring 25 and a lid 24. In the housing 30 is provided a compressed-air connection 27 which communicates with a pressure chamber 31 formed by a housing 30, and which is sealed relative to the valve sleeve 23 by an O-ring seal 26. If no pressure is applied at the compressed-air connection 27, the spring 25, which is supported on the lid 24, which is firmly connected with the housing 30, presses the valve member 28 into the valve seat 29 formed within the valve sleeve 23. As the pressure of the air present in the pressure chamber 31 is increased, it presses the valve member 28 out of the valve seat 29 against the force of the spring 25, and fuel present in the high-pressure line 15 at system pressure is directed into the low-pressure line 16 so as to create a fuel circulation by the continued delivery of the high-pressure pump 5.

FIG. 3 illustrates the fuel supply system according to the invention. The valve 9 is designed as a sliding seat valve: The valve member 28 has a control edge 33 which releases or blocks the flow through the valve in cooperation with the control edge arranged in the valve sleeve 23. In the idle state, the spring 25 presses the valve member 28 against the housing 30 such that only a minimum gap will be left between the valve sleeve 23 and the valve member 28 so as to allow for a small leakage amount. As the pressure chamber 31 is powered with compressed air via the compressed-air line 27, the air pressure presses the valve member 28 in the direction of the lid 24. As soon as the control edge 33 passes the control edge 32 of the valve sleeve 23 on the valve member 28, a markedly larger flow cross-section will be released, with the return amount strongly increasing.

The invention claimed is:

1. A fuel supply system for heavy oil common-rail injection systems for internal combustion engines, including a tank (1), a primary feed pump (3) for delivering heavy oil from the tank (1) to a high-pressure pump (5), wherein the high-pressure pump (5), via at least one high-pressure line (12), is connected to a high-pressure accumulator (rail) (6) feeding at least one injector (8), and, furthermore, a purge valve (9), which is connected to the high-pressure accumulator via a separate high-pressure line (15) for directing at least a portion of the heavy oil back into the tank (1) via a return line, wherein the purge valve (9) comprises a valve member (28) which is movable between an opened and a closed position, a high-pressure connection for a high-pressure line (15) communicating with a heavy oil high-pressure accumulator (rail) (6), a low-pressure connection for a return line, and actuating means for actuating the valve member (28), characterized in that the valve seat (29) of the valve member (28) is designed as a sliding seat.

2. A fuel supply system according to claim 1, characterized in that the valve member (28) is displaceably guided in a valve sleeve (23) and comprises a control edge (33) formed by a setback, which control edge, for opening the valve (9), is displaceable into the region of the high-pressure line radially opening into the valve sleeve (23) and, for closing the valve, is displaceable out of the mouth of the high-pressure line (12) while forming an overlap of the valve member (28) and the valve sleeve (23).

3. A fuel supply system according to claim 1, characterized in that the high-pressure line (15) opens into an annular groove of the valve sleeve (23).

4. A fuel supply system according to claim 1, characterized in that the maximum overlap corresponds to at least 0.1 to 0.5 times the diameter of the valve member.

5. A fuel supply system according to claim 1, characterized in that the actuators are configured as pneumatic means.

6. A fuel supply system according to claim 5, characterized in that a line (27) capable of being powered with pressure medium, particularly compressed air, opens into a chamber defined by a valve member (28) surface extending transversely to the direction of displacement.

7. A fuel supply system according to claim 1, characterized in that a compression spring (25) biasing the valve member (28) in the closing sense is provided.

8. A fuel supply system according to claim 1, characterized in that a preheater is arranged between the tank (1) and the primary feed pump (3) for preheating the heavy oil.

9. A fuel supply system according to claim 1, characterized in that a control device (10) is provided, which cooperates with the purge valve (9) for opening the valve at a standstill of the internal combustion engine.

10. A fuel supply system for heavy oil common-rail injection systems for internal combustion engines comprising:

a tank (1), a high-pressure pump (5), a primary feed pump (3) for delivering heavy oil from the tank (1) to the high-pressure pump (5), a pre-heater arranged between the tank (1) and the primary feed pump (3) for preheating the heavy oil, a high-pressure accumulator (rail) (6), at least one high-pressure line (12), wherein the high-pressure pump (5), via the at least one high-pressure line (12), is connected to the high-pressure accumulator (rail) (6) feeding at least one injector (8), a separate high-pressure line (15), a purge valve (9) connected to the high-pressure accumulator via the separate high-pressure line (15), the purge valve (9) is for directing at least a portion of the heavy oil back into the tank (1) via a return line, the purge valve (9) comprising a valve sleeve (23), a valve member (28) that is displaceably guided in the valve sleeve (23) with the valve member (28) movable between an opened and a closed position, a high-pressure connection for a high-pressure line (15) communicating with a heavy oil high-pressure accumulator (rail) (6), a low-pressure connection for a return line, actuating means for actuating the valve member (28), and a sliding valve seat (29), wherein the valve member (28) includes a control edge (33) formed by a setback from the surface of the valve sleeve, wherein for opening the purge valve (9), the control edge (33) is displaceable into the region of the high-pressure line radially opening into the valve sleeve (23), and wherein for closing the purge valve (9), the control edge (33) is displaceable out of the region of the high-pressure line radially opening into the valve sleeve (23) so as to form an overlap of the valve member (28) and the valve sleeve (23) in which the maximum overlap corresponds to 0.1 to 0.5 times the diameter of the valve member.

* * * * *